United States Patent
Tornatta et al.

(10) Patent No.: US 8,165,315 B2
(45) Date of Patent: Apr. 24, 2012

(54) MULTICHANNEL WIRELESS SYSTEM

(75) Inventors: Paul A. Tornatta, Melbourne, FL (US); Frank M. Caimi, Vero Beach, FL (US)

(73) Assignee: Sky Cross Inc., Melbourne, FL (US)

( * ) Notice: Subject to any disclaimer, the term of this patent is extended or adjusted under 35 U.S.C. 154(b) by 1093 days.

(21) Appl. No.: 12/028,833

(22) Filed: Feb. 10, 2008

(65) Prior Publication Data
US 2008/0192952 A1    Aug. 14, 2008

Related U.S. Application Data

(60) Provisional application No. 60/888,961, filed on Feb. 9, 2007.

(51) Int. Cl.
*H04B 3/00* (2006.01)
(52) U.S. Cl. .................. 381/80; 381/81; 381/77
(58) Field of Classification Search .............. 381/77, 381/78, 80, 81
See application file for complete search history.

(56) References Cited

U.S. PATENT DOCUMENTS

| | | | | |
|---|---|---|---|---|
| 6,487,296 B1 * | 11/2002 | Allen et al. | ...................... | 381/80 |
| 2004/0037433 A1 * | 2/2004 | Chen | ............................... | 381/79 |
| 2005/0195986 A1 * | 9/2005 | McCarty et al. | ................ | 381/79 |

* cited by examiner

*Primary Examiner* — Thinh T Nguyen
(74) *Attorney, Agent, or Firm* — John L. DeAngelis; Beusse Wolter Sanks Mora & Maire, P.A.

(57) ABSTRACT

An audio system responsive to a source of audio programming. The audio system comprising a master amplifier connected to the source of audio programming, the master amplifier providing channelized amplified audio signals at each one of a plurality of channel output connectors and a signal splitter connected to at least one of the plurality of channel output connectors for splitting the channelized amplified audio signal at a selected one of the plurality of channel output connectors into an audio channel signal and a power signal. The audio system further comprising a channel transmit module responsive to the audio channel signal and the power signal for transmitting the audio channel signal, a channel receiver responsive to an intended audio channel signal, a channel amplifier connected to an associated channel receiver for amplifying the intended audio channel signal and a sound reproducing device connected to the channel amplifier for aurally reproducing the intended audio channel signal.

7 Claims, 2 Drawing Sheets

MULTICHANNEL WIRELESS SYSTEM

REFERENCE TO RELATED APPLICATIONS

This application claims the benefit, under 35 U.S.C. 119 (e), of the provisional patent application entitled Multichannel Wireless System filed on Feb. 9, 2007 (wherein Feb. 9, 2008 fell on a Saturday) and assigned application No. 60/888,961.

BACKGROUND OF THE INVENTION

Multichannel audio systems or sound distribution systems are now commonly referred as home entertainment systems. These systems utilize multichannel audio signals to provide a sound field distribution characteristic of "real life" or concert hall events.

Dolby™ surround sound systems, one brand of multichannel home entertainment systems, utilize separate amplifiers for each sound channel and therefore require a separate audio cable to connect the amplifier to each speaker or sound reproducing device (speaker). The latest Dolby system, designated "7.1," (seven surround speakers and one subwoofer speaker) includes seven amplifiers, each with an output and correspondingly seven surround speakers situated at different locations within the home entertainment area. Earlier surround sound systems used five or fewer speakers. All such sound systems require two separate electrical conductors to connect the designated amplifier to each speaker.

In a wireless sound distribution system a multichannel amplifier amplifies a composite digital audio signal from an audio source and distributes the audio signal intended for a specific channel (a speaker may be referred to as a channel) to a wireless transmitter dedicated to that audio channel. A wireless receiver located within or proximate an enclosure of the intended speaker receives the digital audio signal from the associated transmitter. The received signal is then supplied to an audio amplifier for the intended speaker. After amplification the signal is capable of driving the speaker or another sound reproducing device. The channel audio signals are time phased for accurate and realistic sound reproduction at the speaker locations, thereby providing a "real life" sound experience.

Prior art wireless speaker systems suffer from poor audio fidelity, signal drop-out and poor synchronization between audio channels (i.e. objectionable time delays between channels). These effects are due in some cases to the use of the common Bluetooth wireless communications protocol to transmit the signals to each speaker of the home entertainment system. A different communications protocol may be required to avoid these problems. Known solutions may not be feasible for high fidelity surround-sound home theater audio systems due to bandwidth limitations of the selected protocol and hence poor sound fidelity. These system may not be capable of simultaneously handling all sound channels without objectionable time delays between channels.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described device features are not drawn to scale, but are drawn to emphasize specific features relevant to the invention. Like reference characters denote like elements throughout the figures and text.

DETAILED DESCRIPTION OF THE INVENTION

Before describing in detail the exemplary methods and apparatuses related to a multichannel wireless system, it should be observed that the present invention resides primarily in a novel and non-obvious combination of elements and steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1:
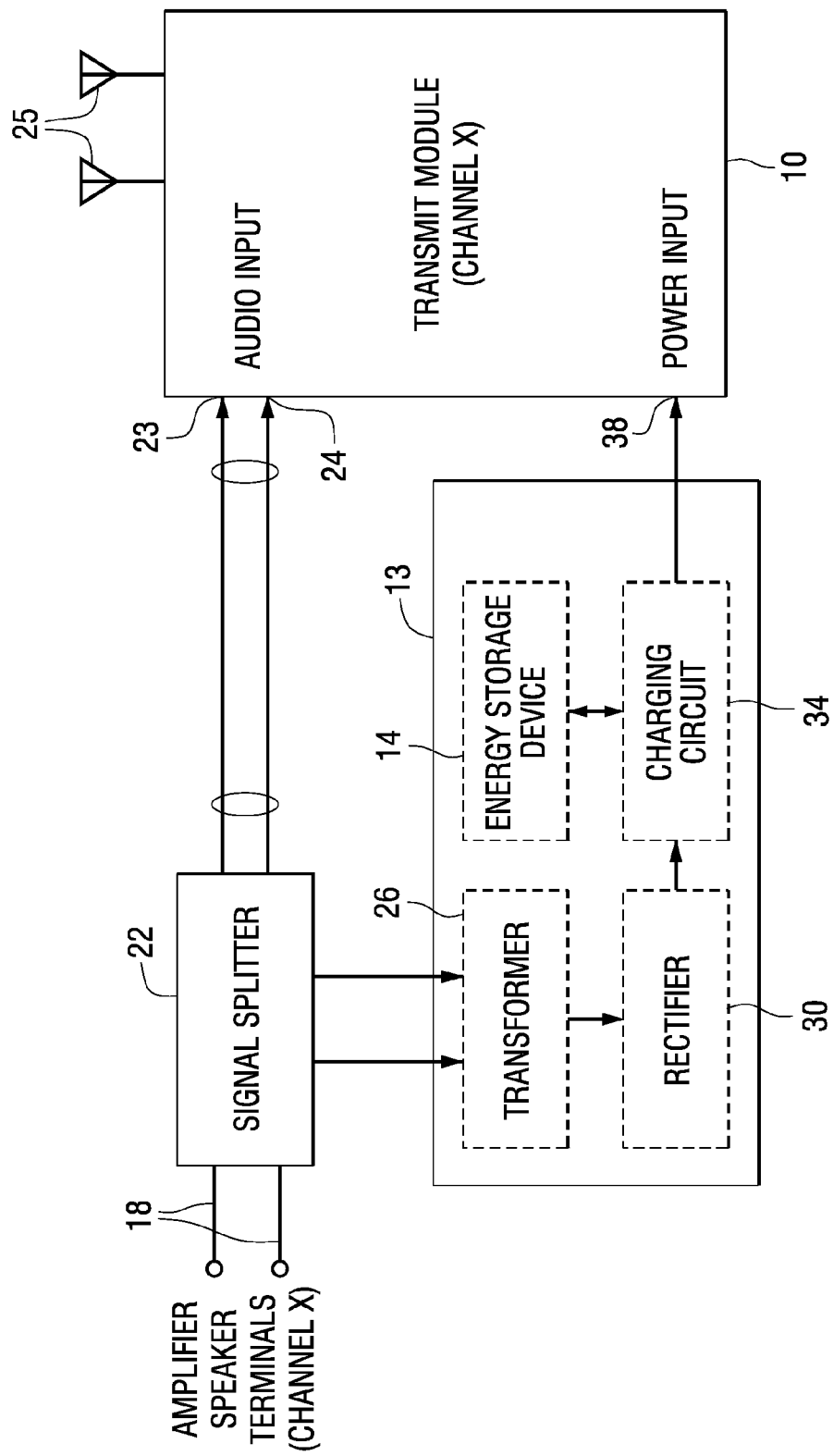
FIG. 1 illustrates elements of a transmit channel of the present invention.

In one embodiment a system architecture of the present invention uses a plurality of self-powered transmitters (or transmit modules) that are sufficiently small to be connected directly to a speaker terminal of a master amplifier. Each speaker terminal thus supplies both power and an audio signal to the transmit module. The audio signal (including an audio level) is transmitted in digital format from the transmit module to each speaker. Thus the audio level is reproduced at each speaker with the same audio balance relative to the other speakers as commanded by the master amplifier. Because most communications protocols use high dynamic range digitization, virtually no noise is added to the system by the transmit module or by a receive module associated with each system speaker. A block diagram of one embodiment of a transmit module is shown in FIG. 1.

Power for a transmit module 10 (each transmit module associated with an audio channel, wherein each audio channel comprises a speaker) is derived from a power module 13 comprising an internal power source or energy storage device 14. According to the invention, the energy storage device 14 is refreshed by the audio source power as derived from the audio signal. Alternatively, the power may be derived from a wall plug source with associated wiring to each transmit module 10. This latter alternative is not shown in FIG. 1.

The power module 13 for each system channel is powered by the energy storage device 14 (a pseudo-capacitor, an energy storage capacitor, a battery, a capacitor or another energy storage device known in the art) as shown. The signal voltage from speaker terminals 18 represents the audio signal that is split into two components by a signal splitter 22. A first component signal carries a low energy audio signal representing the desired audio content to audio terminals 23 and 24 of the transmit module 10. The audio signal digitally modulates a carrier signal in the transmit module 10 and is transmitted to an associated receiver through one or more antennas 25.

A second component signal comprises a higher energy (low impedance) signal. Within the power module 13, the voltage level of the second component is upconverted by a transformer 26, rectified by a rectifier 30 (a low loss rectifier in one embodiment) and coupled to a charging circuit 34 that maintains a relatively constant voltage to the energy storage device 14 and to a power input terminal 38 of the transmit module 10.

The technique of the present invention powers the transmit module 10 during times of use. Power flow may be interrupted to the power input terminal 38 of the transmit module 10 if the audio level is low or zero for an extended period of time. However, the energy storage device 14 can maintain the power flow to the power input terminal 38 for a short period.

Figure 2:
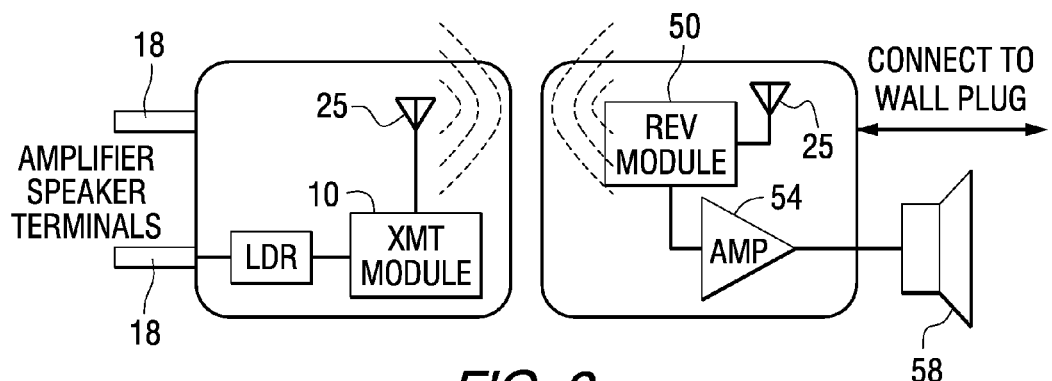
FIG. 2 illustrates a transmit channel and a receive channel of the present invention.

Each receive channel comprises a receiver module 50 that is associated with a specific transmit module 10 as shown in FIG. 2. The received signal is received at the antenna 25, processed through the receiver module 50 and supplied as an input to an amplifier 54 for driving a speaker 58. Each receiver module 50 is a companion to a transmit module 10 for converting the digitally transmitted audio stream to an analog voltage that is supplied as an input to the audio amplifier 54 located within the vicinity of (or within) an enclosure for each system speaker 58. The audio amplifier 54 is of a type known in the art and powers the speaker in a conventional manner. Another embodiment converts the received digital signal to a signal compatible with a digital amplifier used in lieu of the audio amplifier 54. The digital amplifier excites the speaker in a manner known in the art.

Figure 3:
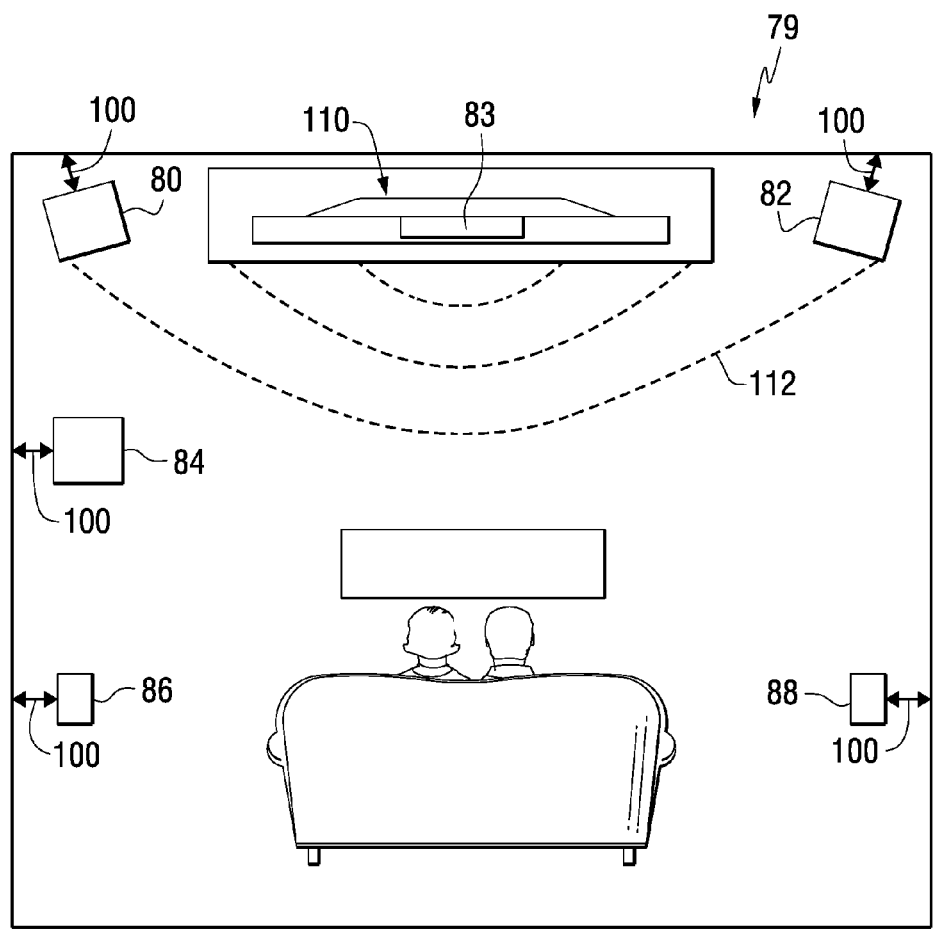
FIG. 3 illustrates elements of a surround sound system to which the teachings of the present invention can be applied.

FIG. 3 illustrates a surround sound system 79 to which the teachings of the present invention can be applied. The system 79 comprises left and right front speakers 80 and 82, a center speaker 83, a subwoofer 84 and left and right rear speakers 86 and 88. Each speaker 80, 82, 83, 84, 86 and 88 is connected to a power source by a conductor 100. A radio frequency controller 110 transmits synchronized radio frequency signals (identified by a reference character 112) to each speaker (channel).

The audio level for each speaker 80, 82, 83, 84, 86 and 88 follows the level presented at the amplifier speaker terminals 18 as encoded in the digitally transmitted source signal.

In one embodiment the system of the present invention utilizes more advanced communications technology and protocols than the Bluetooth standard, operates at a low power than the Bluetooth standard and offers a significant improvement in audio fidelity and channel synchronicity. By operating at a lower power level the system of the present invention enables the presented architecture. The system of the present invention is compatible with any of the existing 5.1 or 6.1 or 7.1 surround sound audio systems and with amplifiers such as those sold by supplies including Onkyo (of Upper Saddle River, N.J.), Denon (of Mahwah, N.J.) and Pioneer (of Tokyo, Japan). The user connects a wireless transmitter (transmit module) to each speaker output of the system amplifier and connects a receiver at each corresponding speaker location. Each receiver operates with one or more power amplifiers and the amplifier(s) connected to an external speaker. Alternatively, the receiver, amplifier and speaker can be integrated into a speaker enclosure a single unit.

The method and elements of the present invention allow consumers to implement surround sound systems and use current technology power amplifiers without the need to install speaker wires from the system amplifier to each speaker. Instead, the consumer purchases each system speaker including a power amplifier to drive the speaker and the accompanying receiver module to receive digital audio signals from the designated transmit module. The present invention provides an easy surround sound system installation in a home theater or other listening location.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. An audio system responsive to a source of audio programming, the audio system comprising:
   a master amplifier connected to the source of audio programming, the master amplifier providing channelized amplified audio signals at each one of a plurality of channel output connectors;
   a signal splitter connected to at least one of the plurality of channel output connectors for splitting the channelized amplified audio signal at a selected one of the plurality of channel output connectors into an audio channel signal and a power signal;
   a channel transmit module responsive to the audio channel signal for transmitting the audio channel signal;
   a power module responsive to the power signal for supplying operating power to the channel transmit module;
   a channel receiver responsive to an intended audio channel signal;
   a channel amplifier connected to an associated channel receiver for amplifying the intended audio channel signal; and
   a sound reproducing device connected to the channel amplifier for aurally reproducing the intended audio channel signal.

2. The audio system of claim 1 the transmit module transmitting the audio channel signal as radio frequency signals or as optical signals.

3. The audio system of claim 1 wherein the signal splitter and the transmit module are enclosed in a single enclosure.

4. The audio system of claim 1 wherein the channelized amplified audio signals from the master amplifier maintain a relative audio level between each one of the channelized amplified audio signals.

5. The audio system of claim 1, the power module comprising:
   a transformer responsive to the power signal from the signal splitter;
   a rectifier connected to the transformer;
   a charging circuit connected to the rectifier, the charging circuit supplying a modified power signal to the transmit module; and
   an energy storage device responsive to the modified power signal for supplying power to the charging circuit as needed.

6. The audio system of claim 5 wherein the energy storage device comprises a capacitor, a battery or another energy device for storing energy.

7. The audio system of claim 1 further comprising a plurality of signal splitters, a like plurality of channel transmit modules, a like plurality of channel receivers, a like plurality of channel amplifiers and a like plurality of sound reproducing devices each of the like plurality of channel receivers responsive to a different audio channel signal.

* * * * *